Dec. 14, 1926.

S. W. BALCH 1,610,413

MAP

Filed Dec. 12, 1924  5 Sheets-Sheet 1

Inventor,
Samuel W. Balch

Dec. 14, 1926.

S. W. BALCH

MAP

Filed Dec. 12, 1924

Inventor,
Samuel W. Balch

Dec. 14, 1926.

1,610,413

S. W. BALCH

MAP

Filed Dec. 12, 1924    5 Sheets-Sheet 3

Inventor.

Samuel W. Balch

Dec. 14, 1926.
S. W. BALCH
MAP
Filed Dec. 12, 1924
5 Sheets-Sheet 4
1,610,413
Fig. 7.
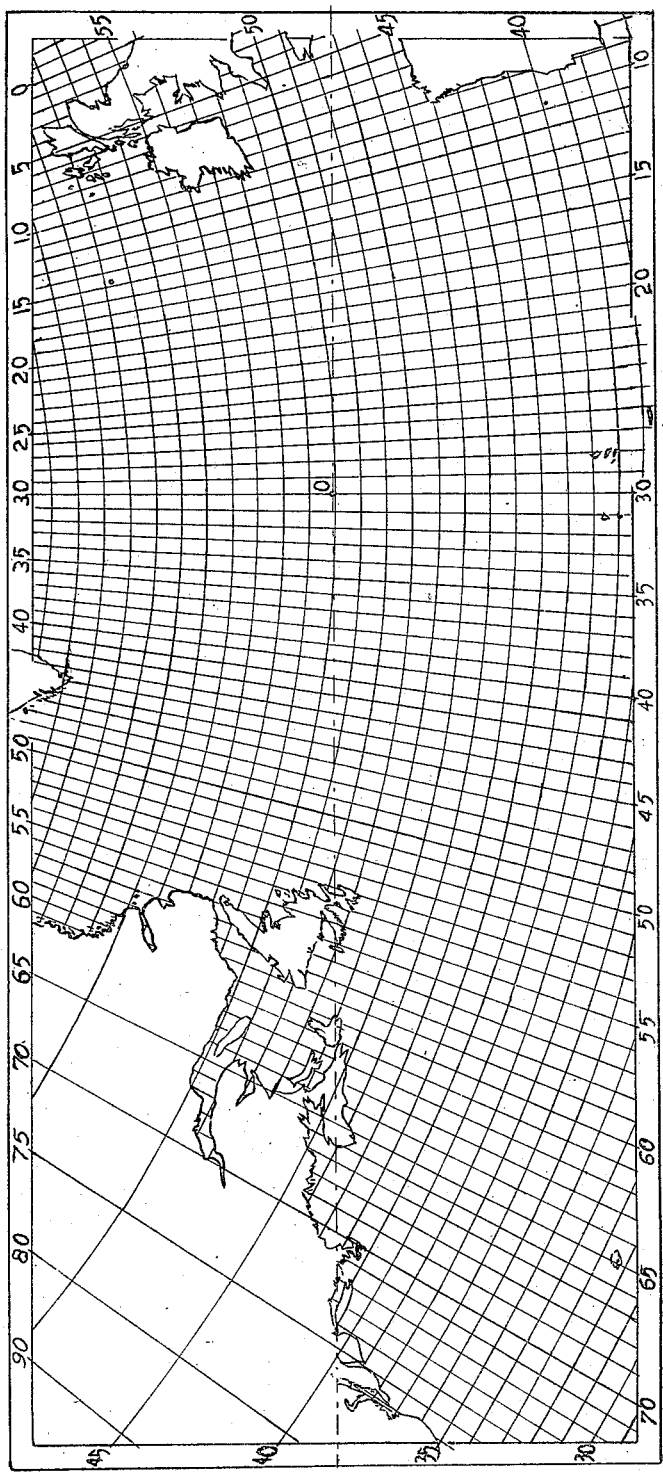
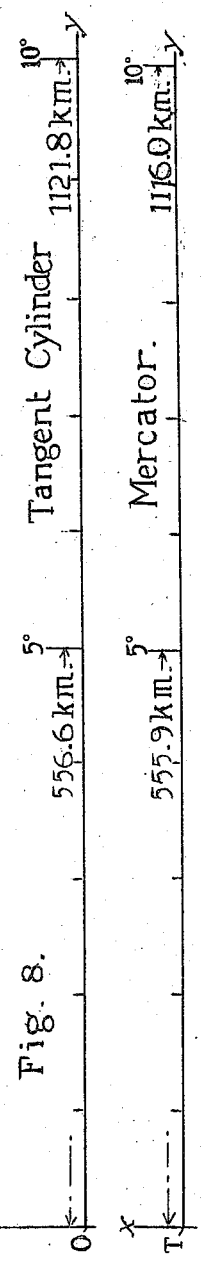
Fig. 8.
Inventor,
Samuel W. Balch

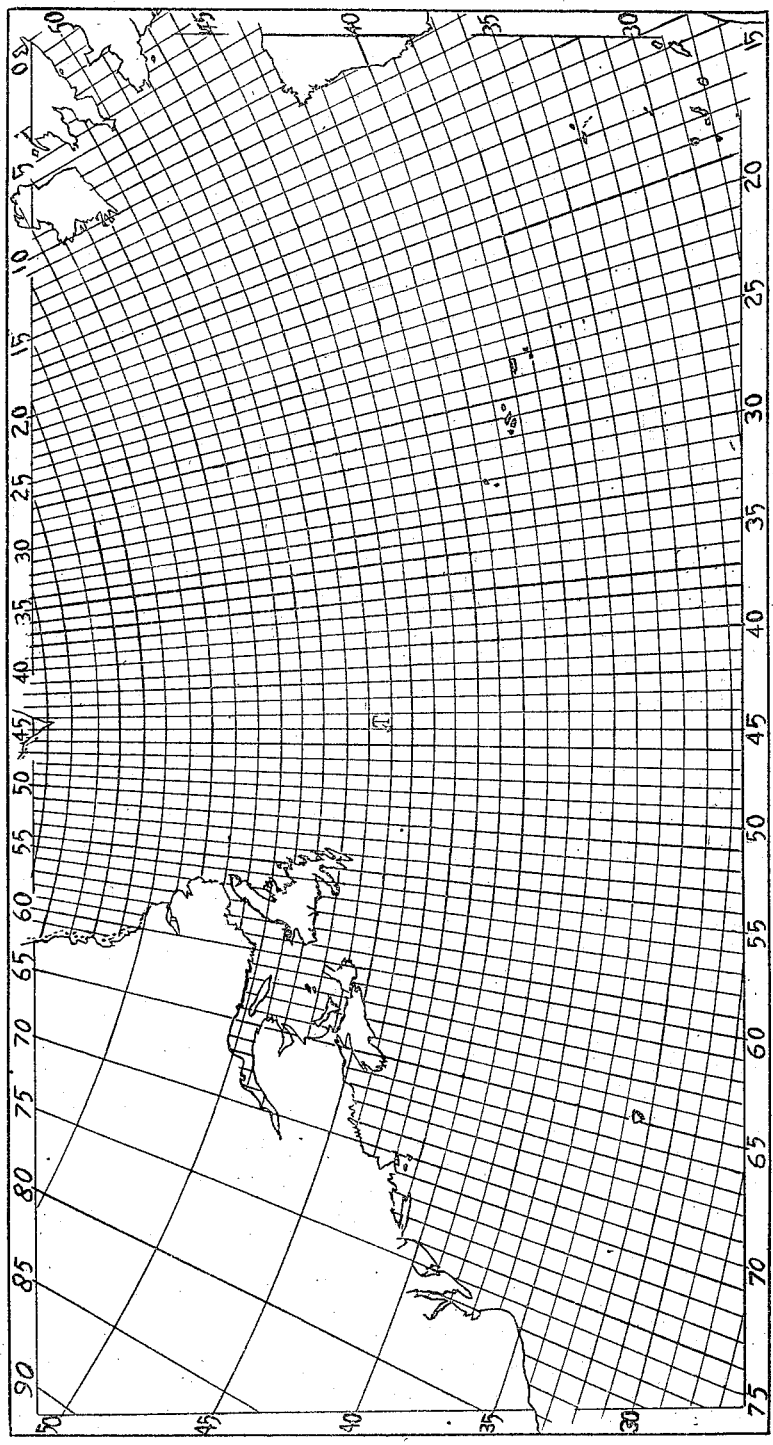

Patented Dec. 14, 1926.

1,610,413

UNITED STATES PATENT OFFICE.

SAMUEL W. BALCH, OF MONTCLAIR, NEW JERSEY.

MAP.

Application filed December 12, 1924. Serial No. 755,415.

This application is filed as a continuation in part of my application filed November 13, 1922, Serial No. 600,547 for ship's course and position indicators.

For the purposes of navigation it is important to have maps or charts on flat or plane sheets which fulfill three mathematical conditions. First, the construction should be such that it will be convenient to draw on the map the course of the shortest sea-level line between any two points, and to ascertain the latitude and longitude at any intermediate point of the course. Such a line is commonly known as the arc of a great circle and would be if the earth were a true sphere, but is in fact a line to be otherwise defined since the earth approximates closely to a spheroid or ellipsoid of revolution, and will be termed a geodesic line. Second, it should be convenient to ascertain the angle at which any geodesic line crosses any intermediate meridian. Third, it should be convenient to ascertain the length of such a line and the distance between any two points on such a line.

Assuming that it is desired to ascertain from a map, if possible, these three kinds of facts with the aid of the three common drafting tools, the straight edge, the protractor, and the scale respectively, and further, assuming that the surface of a true sphere is to be represented, which the earth is not, a form of map projection known as the gnomic has been devised for the first, and a form of map layout known as the Mercator has been devised for the second, each however completely sacrificing the property obtained by the other as such maps are ordinarily made. As to the third condition, the layout of a map on a plane surface to represent according to scale a large area of the earth is deemed impossible.

The object of this invention is to provide a map on a sheet which can be brought into a plane, and which can therefore be printed on a sheet of paper, and which will practically fulfill all three of these conditions and allow for the spheroidal figure of the earth. For use with the highest degree of accuracy of which the map is capable, it is assumed that the instrument set forth in my above mentioned application is to be utilized for the three functions of the straight edge, protractor and scale, but it is also intended to provide maps from which such facts can be ascertained with increased accuracy by the aid of the ordinary drafting tools.

In the accompanying five sheets of drawings which form a part of this description, Figure 1 shows the spheroid of reference used in geodetic surveying to which the earth closely approximates.

Fig. 7 shows a developed tangent cylinder map embodying this invention.

Fig. 8 shows a comparison of ordinates for a tangent cylinder and a Mercator map.

Fig. 9 shows a gnomic map embodying this invention.

Figure 1:
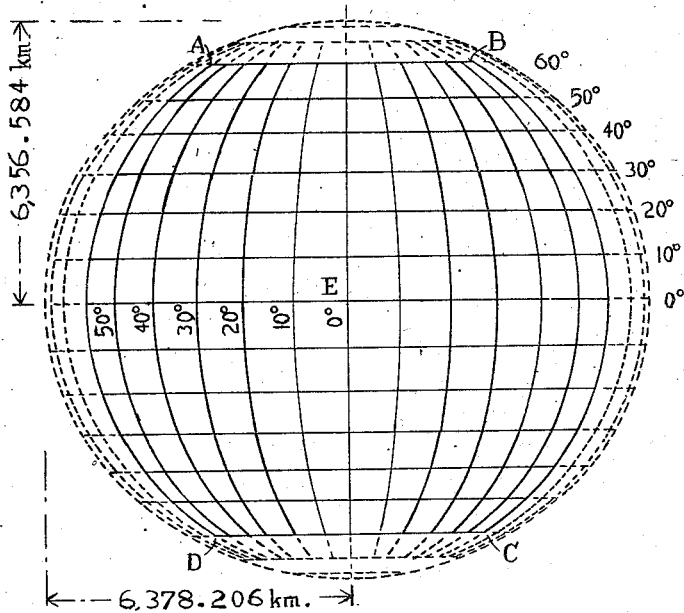
Figure 2:
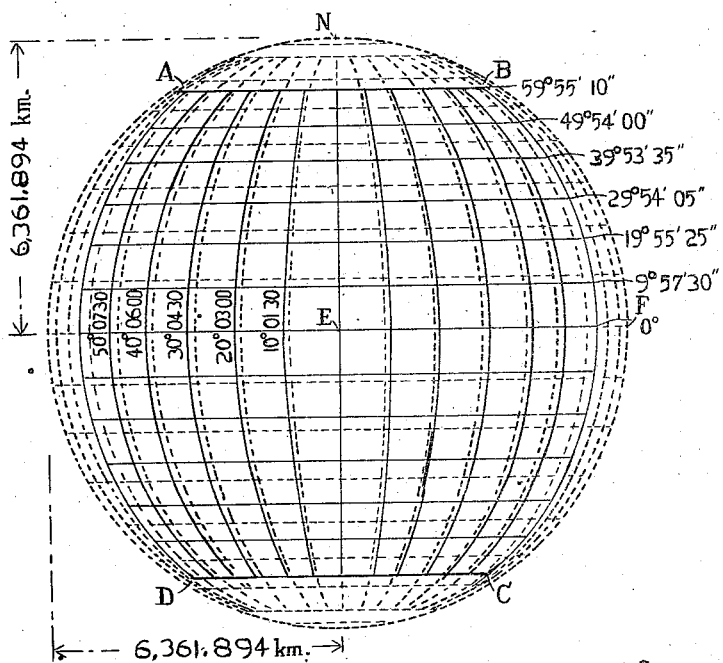
Fig. 2 shows a sphere to which a section of the spheroidal surface can be conformed without material distortion.
Figure 3:
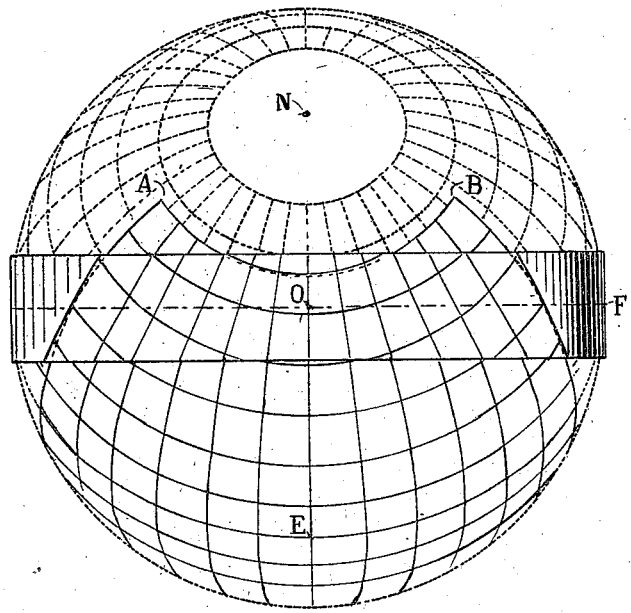
Fig. 3 illustrates the projection from this conformal sphere to a tangent cylinder.
Figure 4:
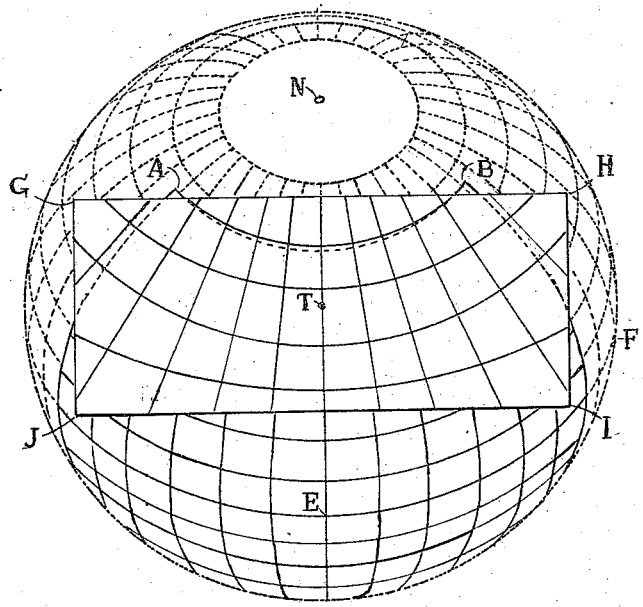
Fig. 4 illustrates the projection from the conformal sphere to a tangent plane for a gnomic map.

A general rule for the construction of maps on either the tangent cylinder, Mercator, or gnomic principles from the spheroid of reference has heretofore been deemed to involve insuperable mathematical difficulties, and such rules as have been given have generally been for projections from a sphere without allowance for the spheroidal form of the earth, except when the equator is made the axis of the map.

As a preliminary step to the practical laying out of a map according to either of the above mentioned principles a sphere is sought to which the desired portion of the spheroidal surface can be conformed by bending and without material alteration of dimensions. The spheroid of reference has an equatorial radius of 6,378.206 kilometers and a polar radius of 6,356.584 kilometers. The drawing is made to a greater eccentricity than the dimensions indicate so that the effect may be apparent without applying instruments as it is not intended to use this figure for the actual geometrical analysis. If it is assumed that a section of this surface A, B, C, D can be detached and that it is flexible but cannot be stretched, and provided that it does not extend beyond latitudes sixty north and south and is not a complete endless band, then it can be conformed to a sphere with a radius R equals 6,361.894 kilometers without material distortion. A minute of arc on this conformal sphere has a length of 1.8506 kilometers and of 1.1499 statute miles. If this surface which is transferred is assumed to carry with it the graticule of meridians and parallels at even ten degree intervals as shown in full lines, these lines will not coincide with the corresponding meridians and parallels of the conformal sphere shown as dotted lines, but the parallels will be shifted toward the equator by various amounts around six minutes of arc and the meridians will be spread apart nine seconds to a degree. In the following table is shown the conformal or reduced latitude $\phi$, and the conformal or reduced longitude $\lambda$, the first column being the original spheroidal latitude and longitude.

| °  | $\phi$ ° ′ ″ | $\lambda$ ° ′ ″ |
|----|-----|-----|
| 0  | 0 00 00 | 0 00 00 |
| 5  | 4 58 40 | 5 00 45 |
| 10 | 9 57 30 | 10 01 30 |
| 15 | 14 56 25 | 15 02 15 |
| 20 | 19 55 25 | 20 03 00 |
| 25 | 24 54 00 | 25 03 45 |
| 30 | 29 54 05 | 30 04 30 |
| 35 | 34 53 45 | 35 05 15 |
| 40 | 39 53 35 | 40 06 00 |
| 45 | 44 53 40 | 45 06 45 |
| 50 | 49 54 00 | 50 07 30 |
| 55 | 54 54 30 | 55 08 15 |
| 60 | 59 55 10 | 60 09 00 |

The reduction for any intermediate latitude can be found by interpolation. The reduction for longitude consists in adding nine seconds for each degree and may be extended beyond what the table shows if necessary. The operation of making a map consists in transferring the graticule from the spheroid of reference to the conformal sphere, projecting the transformed graticule according to any of the established methods of map projection and then restoring the original even degree designations to the meridians and parallels of the projected graticule.

The methods of projection or construction from a sphere will be shown for three types of maps in which the increased accuracy resulting from the foregoing transformations can be utilized.

*The tangent-cylinder map.*

Figure 5:
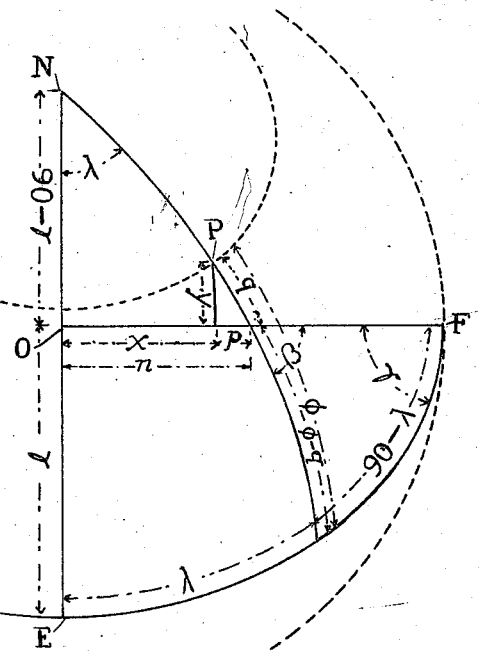
Fig. 5 shows the spherical triangles involved in calculating the coordinates for a tangent cylinder projection.
Figure 6:
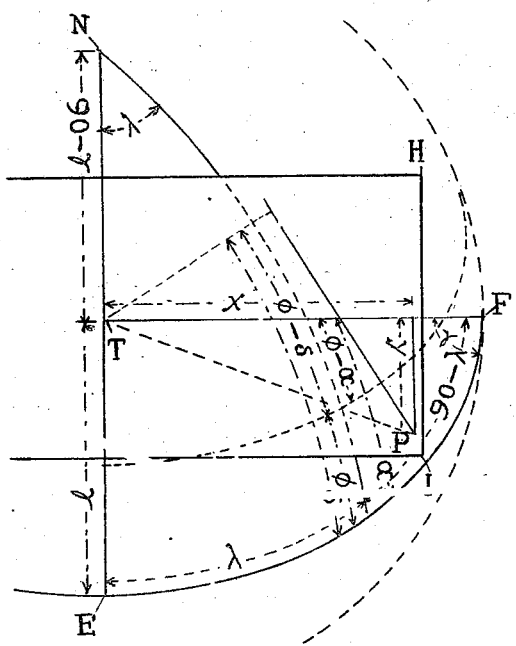
Fig. 6 shows the spherical triangles involved in calculating the coordinates for a gnomic projection.

The object being primarily to produce a map of service in navigation, there exists for it a line of especial interest which is the course of travel. Let OF be the line of interest tangent to conformal latitude $\gamma$ and crossing the equator at angle $\gamma$ at a point distant ninety degrees from the point of tangency to the parallel. The projection is made to a cylinder tangent along this line of interest. In the diagram, Fig. 5 the conformal sphere is shown with EF the equator, N the pole and OF an arc of the great circle along which the cylinder is tangent. Coordinates from O of the point P on the cylinder at longitude $\lambda$ and latitude $\phi$ are found as follows. The coordinates on the sphere will be designated as arcs $x$ and $y$, and if $x$ is in minutes of arc, the coordinates on the cylinder in kilometers will be 1.8506 $x$ and R tan $y$. The following equations can be written for spherical right angle triangles:

$$\tan n = \cos \gamma \tan \lambda$$
$$\tan (\phi+q) = \tan \gamma \cos \lambda$$
$$\cos \beta = \sin \gamma \sin \lambda$$
$$\tan p = \cos \beta \tan q$$
$$x = p + n$$
$$R \tan \beta = R \cot \lambda \div \sin (\phi+q)$$
$$R \tan y = R \tan \beta \sin p$$

There is same sign for $p$ as for $q$, and opposite sign for $y$.

To illustrate the application of the formulæ let it be required to find the coordinates for the graticule on a cylinder tangent along a great circle at inclination $\gamma$ equals 50°, the calculation being for the point P at geodetic longitude 40°, (conformal longitude $\lambda = 40°06'00''$), and geodetic latitude 55°, (conformal latitude $\phi = 54°54'30''$).

In this particular example $p$ and $q$ are minus quantities. Hence $x$ is less than $p$ plus $n$, and $\phi$ is greater than $\phi$ plus $q$. The signs are to be regarded algebraically.

|  | ° ′ ″ |  |  |
|---|---|---|---|
| $\gamma$ | 50 00 00 | log. cos | 9.808067 |
| $\lambda$ | 40 06 00 | log. tan | 9.925352 |
| $n$ | 28 25 32 | log. tan | 9.733419 |
| $\gamma$ | 50 00 00 | log. tan | 0.076186 |
| $\lambda$ | 40 06 00 | log. cos | 9.883617 |
| $\phi+q$ | 42 21 08 | log. tan | 9.959803 |
| $\phi$ | 54 54 30 | | |
| $q$ | −12 33 22 | | |
| $\gamma$ | 50 00 00 | log. sin | 9.884254 |
| $\lambda$ | 40 06 00 | log. sin | 9.808969 |
| $\beta$ | | log. cos | 9.693223 |
| $q$ | −12 33 22 | log. tan | 9.347763 |
| $p$ | − 6 16 17 | log. tan | 9.040986 |
| $n$ | 28 25 32 | | |
| $x$ arc | 22 09 15 | | |
| $x$ minutes | 1329.26 | log. | 3.123610 |
| 1′ km. | 1.8506 | log. | 0.267312 |
| 1.8506 $x$ km | 2459.9 | log. | 3.390922 |
| R | 6361.894 | log. | 3.803586 |
| $\lambda$ | 40 06 00 | log. cot | 0.074648 |
| $\phi+q$ | 42 21 08 | colog. sin | 0.171542 |
| R tan $\beta$ | | log. | 4.049776 |
| $p$ | 6 16 17 | log. sin | 9.038379 |
| R tan $y$ | 1225.1 | log. | 3.088155 |

The quantities, arc $n$, arc $\phi+q$, log. cos $\beta$, and log. R tan $\beta$, are the same for additional points on the same meridan and the calculation of the coordinates is accordingly shortened.

Having calculated the coordinates to the east of the origin they can be used for plotting to the west of the origin by reversing the sign of $x$, and for the southern hemisphere by reversing the signs of $y$. By placing the origin at longitude 30° west, extending the axis forty degrees westward and twenty degrees eastward, and mapping ten degrees each side of the axis, all of the sailing courses between northern American and northern European points on the Atlantic are included. By thus restricting the width of the map, serious distortion is avoided, and for most purposes all of the above mentioned sets of facts can be obtained from it with ordinary drafting tools and with negligible error.

*The Mercator map.*

The Mercator map has an axis like the tangent-cylinder projection. As generally known, the equator is the axis. To plot such a map from the conformal sphere on an oblique axis the abscissa for any point is the same as for the tangent cylinder projection. The ordinates are slightly shorter, the difference being slight for the first ten degrees, as will be seen from Fig. 8 in which the ordinates up to ten degrees are plotted to the same scale for each degree on both systems for comparison. To compute the length of an ordinate, arc $y$ is first found by the following equation:

$$\tan y = \cot \lambda \sin p \div \sin (\phi+q)$$

The logarithm of an ordinate with a minute of arc as the unit is given by the expression $$3.898489 + \log. [\log. \cot \tfrac{1}{2}(90-y)]$$

To find the length of an ordinate with the kilometer as the unit, the logarithm of 1.8506 is added to the constant. In the above example the work is as follows

|  | ° ′ ″ |  |
|---|---|---|
| $\gamma$ | 40 06 00 | log. cot 0.074649 |
| $\phi+q$ | 42 21 08 | colog. sin 0.171542 |
| tan $\beta$ |  | log. 0.246191 |
| $p$ | 6 16 17 | log. sin 9.038379 |
| tan $y$ |  | log. tan 9.284570 |
| $=(90-y)$ | 10 53 58 | log. cot 0.083120 |
|  | 39 33 01 |  |
| Constant |  | log.log. cot 2.919702 |
|  |  | 4.165802 |
| Ordinate, km | 1217.6 | log. 3.085504 |

A map plotted from coordinates calculated by either of the above methods with a scale having one-tenth of a millimeter as its unit will show the earth's surface to a scale of one to ten million with negligible error for several degrees on either side of the axis.

*The gnomonic map.*

The gnomonic map is illustrated as a projection by prolonging radii from intersecting points of the transferred graticule on the conformal sphere to a plane G, H, I, J, which is tangent at T, latitude $\gamma$ on the zero meridian. Coordinates $x, y$ of a point P are found from the longitude $\lambda$ and latitude $\phi$ by the following equations:

$$\cot \delta = \cot \gamma \cos \lambda$$
$$\tan \alpha = \tan \gamma \cos \lambda$$
$$x = \frac{R \sin \delta \sin \lambda \cos \phi}{\sin \gamma \cos (\phi - \delta)}$$
$$u = \frac{R \cot \gamma \sin \delta}{\cos \alpha}$$
$$y = \frac{u \sin (\phi - \alpha)}{\cos (\phi - \delta)}$$

To illustrate the application of the formulæ let it be required to find the coordinates for the graticule on a plane tangent at latitude $\gamma$ equals 45°, the calculation being for the point P at geodetic longitude 40°, (conformal longitude $\lambda = 40°06'00''$), and geodetic latitude 25°, (conformal latitude $\phi = 24°54'40''$).

|  | ° ′ ″ |  |
|---|---|---|
| $\gamma$ | 45 00 00 | log. cot 0.000000 |
| $\lambda$ | 40 06 00 | log. cos 9.883617 |
| $\delta$ | 52 35 13 | log. cot 9.883617 |
| $\gamma$ | 45 00 00 | log tan 0.000000 |
| $\lambda$ | 40 06 00 | log. cos 9.883617 |
| $\alpha$ | 37 24 47 | log. tan 9.883617 |
| R | 631.894 | log. 3.803586 |
| $\gamma$ | 45 00 00 | log. cot 0.000000 |
| $\delta$ | 52 35 13 | log. sin 9.899971 |
| $\alpha$ | 37 24 47 | colog. cos 0.100029 |
| $u$ |  | log. 3.803586 |
| $\phi$ | 24 54 40 |  |
| $\delta$ | 52 35 13 |  |
| $\phi-\delta$ | −27 40 33 | log cos 9.947233 |
| $\phi$ | 24 54 40 |  |
| $\alpha$ | 37 24 47 |  |
| $\phi-\alpha$ | −12 30.07 | log. sin 9.335407 |
| R | 631.894 | log. 3.803586 |
| $\delta$ | 52 35 13 | log. sin 9.899971 |
| $\lambda$ | 40 06 00 | log. sin 9.808961 |
| $\phi$ | 24 54 40 | log. cos 9.957589 |
| $\gamma$ | 45 00 00 | colog. sin 0.150515 |
| $\phi-\delta$ |  | colog. cos 0.052767 |
| $x$ km | 4714.0 | log. 3.673389 |
| $u$ |  | log. 3.803586 |
| $\phi-\alpha$ | −12 30 07 | log. sin 9.335407 |
| $\phi-\delta$ | −27 40 33 | colog. cos 0.052767 |
| $y$ | −1555.1 | log. 3.191760 |

In plotting it will be convenient to start with a sheet large enough to include the pole even if the portion adjacent to it is to be discarded in the finished map. The position of the pole is first determined. Both coordinates are calculated for only one point on each meridian along the edge of the map remote from the pole. These points and the pole define all of the meridians since they are straight lines in this projection. Additional points on a meridian can be determined from the ordinate only. The quantities, log $u$, $a$, and $\delta$ are the same for additional points on the same meridian and do not have to be recalculated.

I claim:

1. A map having a graticule which is constructed from a conformal sphere in which each parallel of latitude has been displaced toward the equator and the meridians spread by an amount which will bring distances along the meridians and parallels into substantially the same scale.

2. A map having a graticule which is constructed from a conformal sphere in which each parallel of latitude has been displaced toward the equator and the meridians spread by an amount which will bring distances along the meridians and parallels into substantially the same scale, the map having an axis to an oblique great circle of the conformal sphere.

3. A map having a graticule which is projected to a tangent cylinder from a conformal sphere in which each parallel of latitude has been displaced toward the equator and the meridians spread by an amount which will bring distances along the meridians and parallels into substantially the same scale, the tangent axis being an oblique great circle of the conformal sphere.

SAMUEL W. BALCH.